(12) United States Patent
Philipson et al.

(10) Patent No.: US 10,598,965 B2
(45) Date of Patent: Mar. 24, 2020

(54) POLARIZATION CONTROL BASED UPON A POLARIZATION REFERENCE STATE

(71) Applicant: VIAVI SOLUTIONS INC., Milpitas, CA (US)

(72) Inventors: Joshua Philipson, Ottawa (CA); Chris Wagner, Kanata (CA); Grant Tessaro, Ottawa (CA); Robert Matthew Adams, Ottawa (CA)

(73) Assignee: VIAVI SOLUTIONS INC., San Jose, CA (US)

( * ) Notice: Subject to any disclaimer, the term of this patent is extended or adjusted under 35 U.S.C. 154(b) by 187 days.

(21) Appl. No.: 15/011,189

(22) Filed: Jan. 29, 2016

(65) Prior Publication Data

US 2017/0219853 A1 Aug. 3, 2017

(51) Int. Cl.
*G02F 1/01* (2006.01)
*G02B 6/27* (2006.01)
*G01B 11/27* (2006.01)
*G01J 4/04* (2006.01)

(52) U.S. Cl.
CPC .......... *G02F 1/0136* (2013.01); *G01B 11/272* (2013.01); *G02B 6/2713* (2013.01); *G02F 1/0121* (2013.01); *G01J 4/04* (2013.01); *G02F 2001/0139* (2013.01)

(58) Field of Classification Search
CPC ........ G02F 1/011; G02F 1/0121; G02F 1/035; G02F 2201/12
USPC .......................................................... 359/239
See application file for complete search history.

(56) References Cited

U.S. PATENT DOCUMENTS

| 7,067,795 B1* | 6/2006 | Yan ........................ G02F 1/0123 250/225 |
| 2009/0101297 A1* | 4/2009 | Jez ......................... G01N 21/23 162/198 |
| 2011/0007232 A1* | 1/2011 | Shen ..................... G02F 1/0136 349/18 |

* cited by examiner

*Primary Examiner* — Joseph P Martinez
*Assistant Examiner* — Vipin Patel
(74) *Attorney, Agent, or Firm* — Mannava & Kang, P.C.

(57) ABSTRACT

According to an example, a polarization control system is to manipulate polarization manipulators to output light that achieves a trajectory on a Poincaré sphere that tracks a known trajectory of a polarizer on the Poincaré sphere, in which the trajectory of the output light enables definition of a reference polarization state of the output light. The polarization control system may also manipulate an output polarization manipulator to set the output light to a predefined polarization state based upon the reference polarization state.

16 Claims, 8 Drawing Sheets

POLARIZATION CONTROL BASED UPON A POLARIZATION REFERENCE STATE

BACKGROUND

Coherent optical networks often employ a subsystem at the receiver back end that performs polarization demultiplexing (POLMUX). In brief, POLMUX refers to the optical separation and associated digital signal processing (DSP) required to detect and separate the eigenpolarizations of the transmission link, even as the polarization of transmission link undergoes rapid state changes. Testing is often performed to determine how well POLMUX circuitries under test are able to handle the changes in rates at which the states are scrambled or changed. Current testing methods often generate scrambling patterns for the testing through performance of an alignment phase in which a human or automation system aligns the input state of polarization to the polarization scrambler and the use of a polarimeter or external optical feedback to calibrate the alignment.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
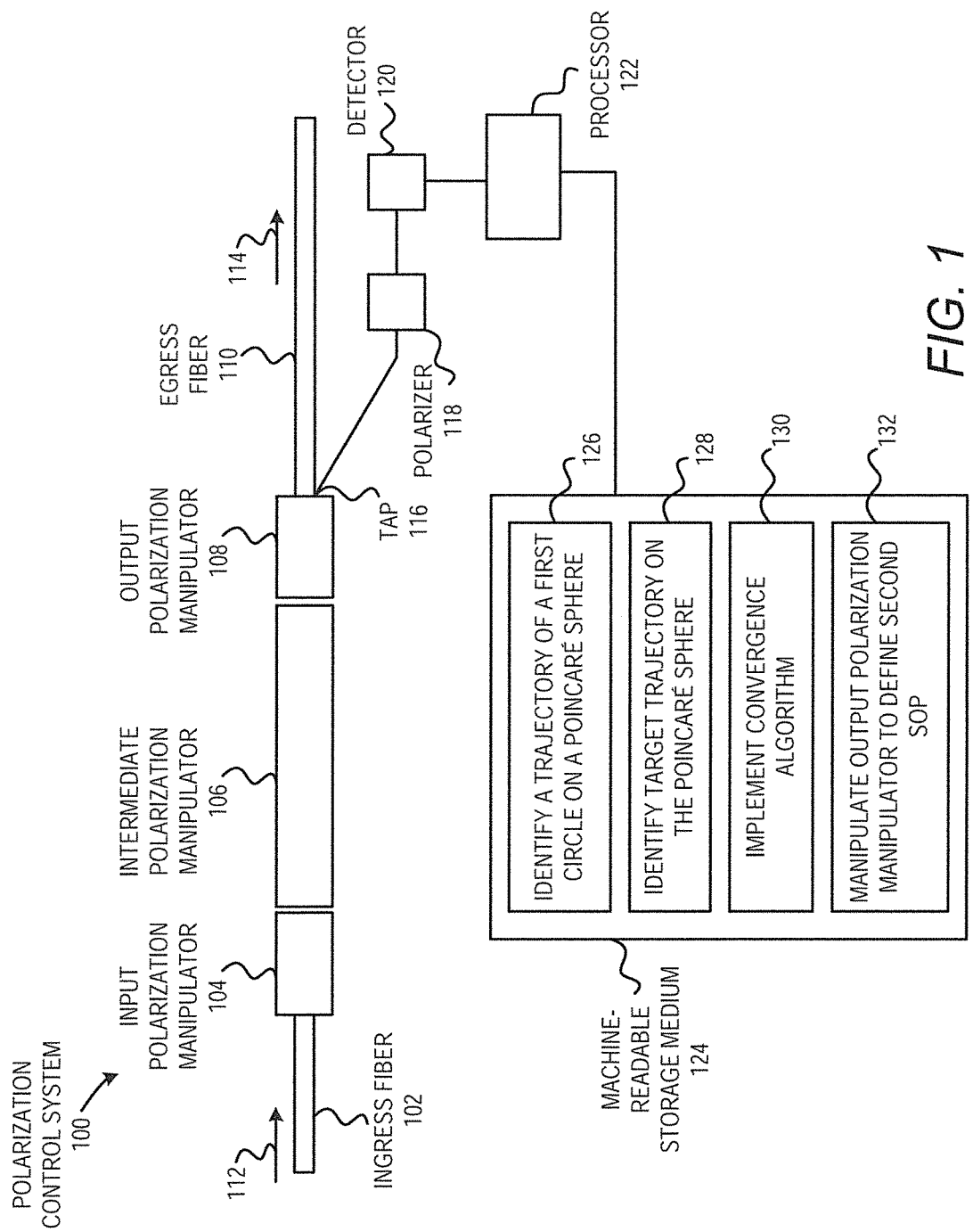
FIG. 1 shows a simplified block diagram of a polarization control system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Additionally, It should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Disclosed herein are methods and apparatuses for controlling polarization of light based upon a reference polarization state of the light. Particularly, the methods and apparatuses disclosed herein may enable a polarization reference state to be derived from a state of an input light. The reference polarization state may be used in multiple ways. For instance, the reference polarization state may be used to achieve a great circle spinner (so that the statistics of a deltaSOP (state of polarization) may be determined absolutely given a known electrical drive rate of polarization manipulators (e.g., electrooptic waveplates) through which the light passes, to define a second SOP relative to the dynamically determined reference polarization state using output polarization manipulator waveplate angles, etc. That is, for instance, the angles of the output polarization manipulator waveplate that provide a user-desired state (e.g., the second SOP) may be known once the reference polarization state is determined, and thus, the user-desired state may be achieved. The user-desired state (e.g., the second SOP) may be tracked by tracking the powers P1, P2 through a first polarizer and a second polarizer.

Through implementation of the methods and apparatuses disclosed herein, the determined reference polarization state may be used to distribute scrambling of polarized light in a deterministic and calibrated manner. The methods and apparatuses disclosed herein may therefore be used in testing and verification of optical networks. For instance, the methods and apparatuses disclosed herein may enable advanced polarization control functionality for network equipment manufacturers, manufacturing test and measurement environments, optical research and development, etc. By way of particular example, the methods and apparatuses disclosed herein may be used to test a subsystem at a receiver back end that performs polarization demultiplexing (POLMUX) in a coherent optical network. That is, through identification and setting of the polarization state of the light inputted into the control system, the rates at which polarization scrambling distributions are varied may be controlled. The controlled rates may be used to determine how POLMUX circuitry respond and handle the different rates of scrambling.

Historically, the chief figures of merit for scrambled signals were the peak scrambling rates, in which the polarization of optical signals was randomly scrambled at different peak scrambling rates. In contrast, the methods and apparatuses disclosed herein enable a scheme in which the scrambling rate and a constrained distribution of the SOP of an output light may be simultaneously controlled to a narrow known & calibrated range without use of external equipment. Accordingly, in one regard, the methods and apparatuses disclosed herein may enable a deterministic and repeatable way to probe a System Under Test (SUT) and to characterize and controllably test the analog of the Input Impulse Response of a POLMUX system.

Additionally, through implementation of the apparatus and methods disclosed herein, the reference polarization state of an input light may be determined without requiring performance of an alignment phase in which a human or automation system aligns the input light SOP to a plane between a first polarization state (S1) and a second polarization state (S2) on a Poincaré sphere or more generally, to a "great circle" on the Poincaré sphere. In addition, the reference polarization state of the input light may be determined without requiring the use of a polarimeter or external optical feedback to calibrate the alignment of the input light SOP to the polarization scrambler. Accordingly, through implementation of the methods and apparatuses disclosed herein, the reference polarization state of an input light may be determined through a series of dynamic measurements based upon a polarization reference as defined by a polarizer instead of using an external polarimeter. Additionally, the output light may be set to a predefined polarization state based upon the reference polarization state.

FIG. 1 shows a simplified block diagram of a polarization control system 100, according to an example of the present disclosure. As shown, the polarization control system 100 may include an ingress fiber 102, an input polarization manipulator 104, an intermediate polarization manipulator 106, an output polarization manipulator 108, and an egress fiber 110. According to an example, the input polarization manipulator 104 and the output polarization manipulator 108 may be any reasonably suitable device that is capable of any-to-any polarization transform. In other words, each of the input polarization manipulator 104 and the output polarization manipulator 108 may transform received light having any polarization to outputted light having any other polarization. The intermediate polarization manipulator 106 may be a half-wave plate or an equivalent type of polarization manipulating or modulating device. By way of particular example, the input polarization manipulator 104 and the output polarization manipulator 108 are each composed of two quarter-wave plates. In addition, each of the quarter-wave plates and the half-wave plate may include a waveguide implementation, such as a Lithium Niobate (LiNbO$_3$) electrooptic waveguide implementation, a bulk crystal implementation, etc. In other examples, the input polarization manipulator 104, the intermediate polarization manipulator 106, and the output polarization manipulator 108 may be composed of other types of manipulators or modulators.

In operation, an input light, represented by the arrow 112, may be directed into the input polarization manipulator 104 through the ingress fiber 102. The light may be outputted from the input polarization manipulator 104 and supplied into the intermediate polarization manipulator 106. In addition, the light may be outputted from the intermediate polarization manipulator 106 and supplied into the output polarization manipulator 108. The light may be outputted from the output polarization manipulator 108 and through the egress fiber 110 as outputted light, which is represented by the arrow 114. According to an example, the input polarization manipulator 104, the intermediate polarization manipulator 106, and the output polarization manipulator 108 may manipulate the light to scramble the polarization of the outputted light 114. Polarization scrambling may be defined as a process in which the polarization of light is varied so that the average polarization of the light is effectively randomized over time. Polarization scrambling may be used, for instance, in scientific experiments to cancel out errors caused by polarization effects, to avoid polarization hole-burning, testing procedures for fiber optic data transmission systems, etc.

The input light 112 may have any SOP as the input light 112 enters into the input polarization manipulator 104 and the SOP of the input light 112 may not be known. The input polarization manipulator 104, the intermediate polarization manipulator 106, and the output polarization manipulator 104, may be manipulated according to the methods disclosed herein to derive a reference polarization state and the light outputted from the output polarization manipulator 104 may be set to the reference polarization state. Additionally, the derived reference polarization state may be used to define a second SOP that enables an output light 114 to have a user-desired SOP through manipulation of the output polarization manipulator 104. Various manners in which the input polarization manipulator 104, the intermediate polarization manipulator 106, and the output polarization manipulator 104 may be manipulated to derive the reference SOP and define the second SOP are discussed in greater detail herein below.

Figure 8:
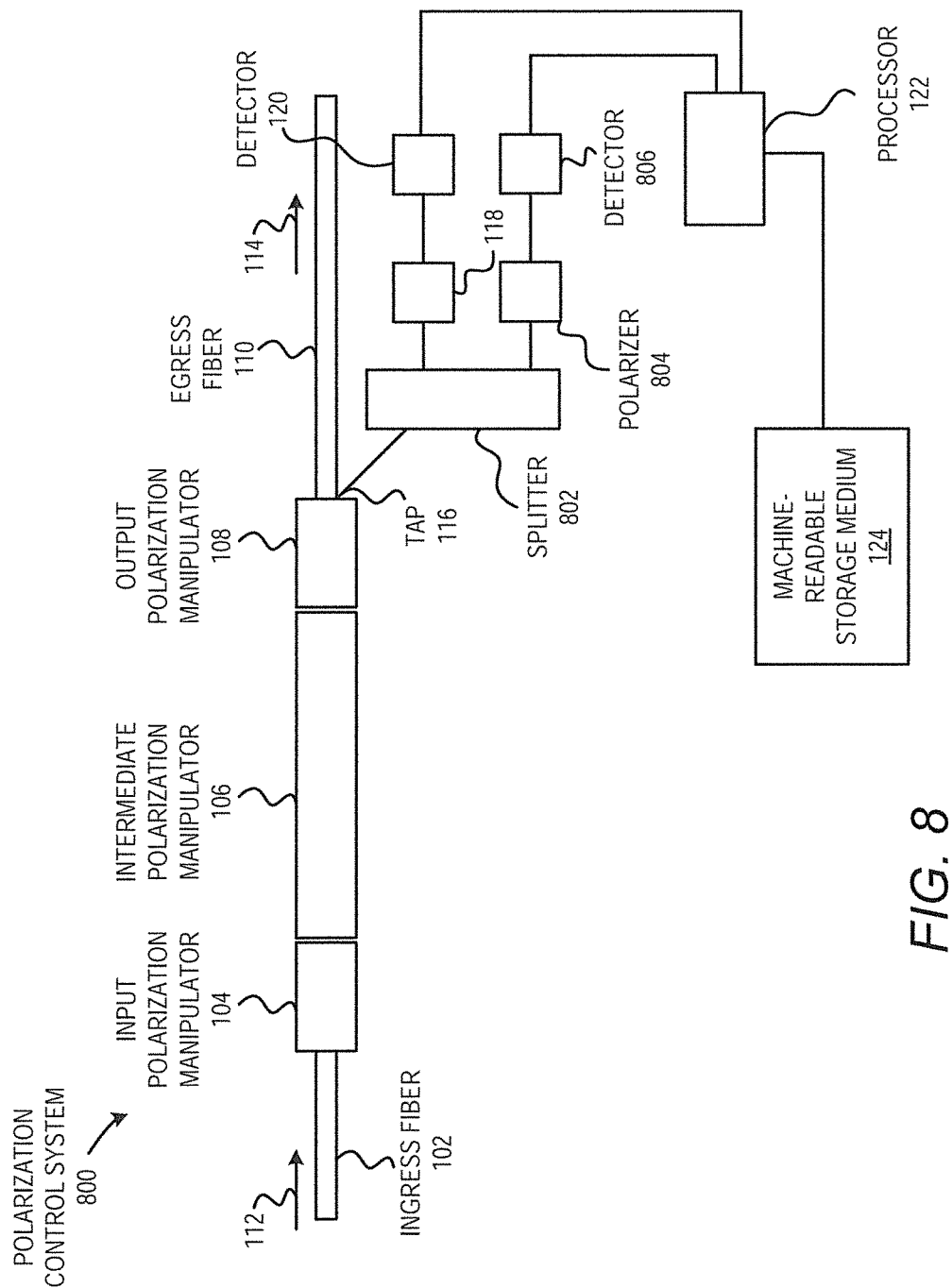
FIG. 8 shows a simplified block diagram of a polarization control system, according to another example of the present disclosure.

As also shown in FIG. 1, a tap 116 may be positioned at the output of the output polarization manipulator 108 such that the output light 114 may be directed through a polarizer 118 and onto a detector 120. The polarizer 118 may be any suitable type of polarizer and the detector 120 may be any suitable type of detector, such as a photodiode. Although a single polarizer 118 and a single detector 120 have been depicted in FIG. 1, additional polarizers 118 and detectors 120 may be positioned such that the tapped output light 114 is also directed through the additional polarizers 118 and detectors 120, for instance, as shown in FIG. 8, which is described below.

In any regard, the detector 120 may detect the intensity, e.g., power level, of the output light 114 after the output light 114 has passed through the polarizer 118. In this regard, the detected intensity of the light depends upon the polarization state of the output light 114 as the polarizer 118 may block waves of light that are outside of a specific polarization. The detector 120 may also output the detected intensity of the output light 114 to a processor 122, which may be a central processing unit (CPU), a microprocessor, a processor, an application specific integrated circuit (ASIC), a system-on-chip (SoC), or the like. The processor 122 may store a plurality of the detected intensity levels in a data store (not shown) and may utilize the detected intensity levels to implement or execute machine-readable instructions stored in a machine-readable storage medium 124 as described in greater detail herein below.

The processor 122 may collect, e.g., sample, a plurality of intensity measurements from the detector 120 over time as the intermediate polarization manipulator 106 causes a polarization direction of the output light 114 to be rotated. For instance, the intermediate polarization manipulator 106 may be a half-waveplate controlled such that the polarization of the light being outputted from the intermediate polarization manipulator 106 is spun or rotated, e.g., through 360 degrees or less, on the Poincaré sphere. The intensity levels of the output light 114 may vary between a lower intensity level and a higher intensity level as the polarization of the output light 114 is rotated and follows a trajectory on a Poincaré sphere between the lower intensity level and the higher intensity level. According to an example, the output polarization manipulator 108 may not apply any polarization modification to the light outputted from the intermediate polarization manipulator 106 during operations of the methods disclosed herein.

Figure 2:
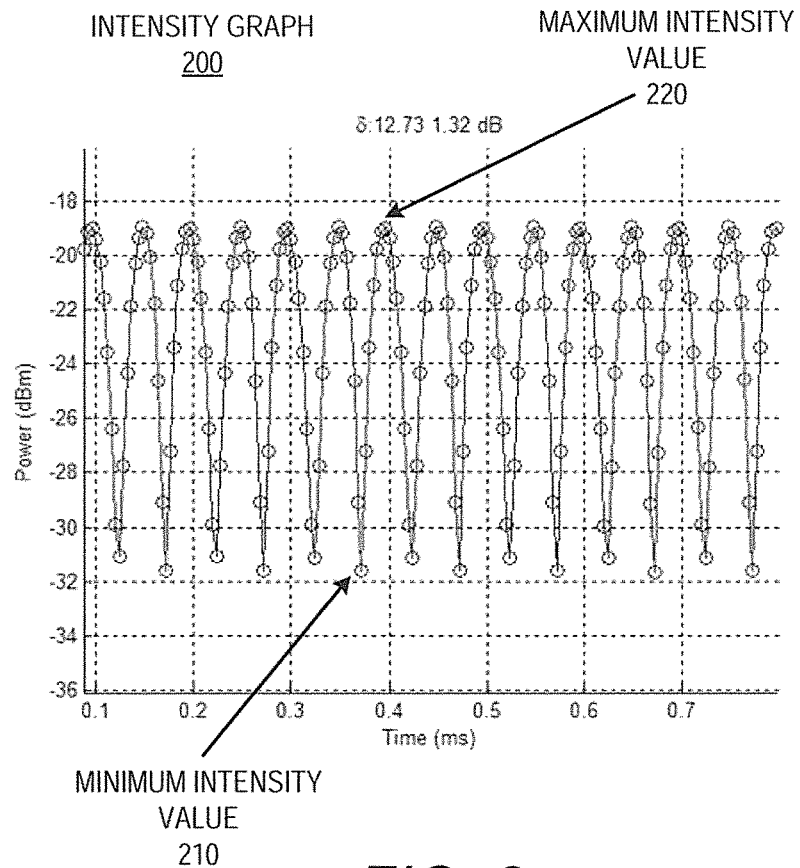
FIG. 2 shows an intensity graph that depicts how the intensity of output light changes over time as the polarization direction of the output light is rotated and detected by a detector after the output light is emitted through a polarizer, according to an example of the present disclosure.

An example of the detected intensity levels resulting from the polarization direction of light being spun through multiple revolutions is shown in FIG. 2. FIG. 2, more particularly, depicts an intensity graph 200 that shows how the intensity (e.g., Power (dBm)) of the output light 114 changes over time as the polarization direction of the output light 114 is rotated and detected by the detector 120 after the output light 114 has been emitted through the polarizer 118. As shown in the intensity graph 200, the intensity levels fluctuate between a minimum intensity value 210 and a maximum intensity value 220. It should be clearly understood that the features depicted in FIG. 2 are for illustrative purposes only and are thus not intended to limit the present disclosure in any respect.

Generally speaking, and with reference back to FIG. 1, the machine-readable storage medium 124 includes instructions that when executed, are to establish a known rate of polarization scrambling in the polarization control system 100 through use of a trajectory that is a ring that is normalized to a great circle on the Poincaré sphere. The trajectory, which is a ring on the Poincaré sphere, may be identified with respect to the Poincaré sphere from the intensity levels of polarized light resulting from the spinning or rotating of the intermediate polarization manipulator 106 (e.g., the intensity levels may be mapped and correlated with SOPs on the Poincaré sphere. The specific trajectory (although not uniquely identified because the great circle may be tilted at any angle along the Poincaré sphere), is a trajectory that coincides with the minimum and maximum power poles of the polarizer 118 on the Poincaré sphere. The instructions may implement an algorithm that is to converge the trajectory with a great circle on the Poincaré sphere. By way of example, the algorithm may have two components, a first component to establish a trajectory of a ring that is parallel to the great circle and a second component to maximize the size of the parallel ring. Optimization of these two components may approach, in the limit, the target ring, i.e., the great circle in the plane of the polarizer 118.

The machine-readable storage medium 124 is thus depicted as including instructions to identify a trajectory of a first circle on a Poincaré Sphere 126, identify a target trajectory on the Poincaré sphere 128, and implement a convergence algorithm to converge the trajectory of the first circle to the target trajectory (i.e., maximize the size of the first circle. As discussed above, the target trajectory may be a great circle on the Poincaré sphere that is in the plane of the polarizer 118. Particularly, the processor 122 may execute the instruction 126 to map the detected intensity values onto a Poincaré sphere that graphically represents polarization states of light. As shown in FIG. 2, the detected intensity values may fluctuate between a minimum intensity value 210 and a maximum intensity value 220. As such, a rotating polarization direction of light outputted by the intermediate polarization manipulator 106 may be mapped as a ring or a first circle on the Poincaré sphere corresponding to the rotation of the polarization direction of the output light by the intermediate polarization manipulator 106. In this regard, if the intermediate polarization manipulator 106 continuously rotates the polarization direction of the light, the instantaneous SOP will revolve around the Poincaré sphere to a mapped ring that continuously revolves around the Poincaré sphere. In other words, an SOP point will revolve to create a locus of points creating a 'mapped ring' on the Poincaré sphere. The size and orientation of the ring on the Poincaré sphere will depend on the state of polarization of the light entering the intermediate polarization manipulator 106.

For one quarter of a full physical rotation of the intermediate polarization manipulator 106, a single ring will be traced out once, independent of its size and orientation on the Poincaré sphere. For instance, it does not matter if the ring is very small, or if the ring is a great circle, one complete circle will be traversed. A great circle is defined as a circle or ring formed on the Poincaré sphere whose cross-section includes the origin (i.e., in 3D) of the Poincaré sphere. Since the circumference of the ring varies, for the case of the same physical rate of rotation of a waveplate, it is evident that a small ring will have a lower dSOP/dt in comparison with the dSOP/dt of a larger circle. The largest possible circle on the Poincaré sphere is a great circle, and as discussed herein, the intensity measurements are defined and calibrated to an absolute rate according to a great circle on the Poincaré sphere because the dSOP on the Poincaré sphere is fixed for a known physical waveplate if the circle on the Poincaré sphere is the great circle. dSOP or ΔSOP is a measure of the angle subtended by two polarization states on the Poincaré sphere. It then follows that dSOP/dt may be defined as the rate of change in angle subtended by two polarization states per unit time, or in other words, the speed at which the SOP is changing. For a ring on the Poincaré sphere, for any equal time interval, dt, the dSOP, or angular polarization change, will be approximately a constant for a constant rate of revolution of the intermediate polarization manipulator 106, which may be a half-wave plate or equivalent device. In other words, the rotation rate around the ring may be uniform for a constant rate of revolution of the polarization direction. In addition, by achieving the great circle for the ring formed by rotation of the polarization direction of light outputted from the intermediate polarization manipulator 106, the dSOP/dt will be absolutely specified for any known rate of rotation of the intermediate polarization manipulator 106, for any input SOP.

As described in greater detail below and according to an example, the polarization direction of an input light to the intermediate polarization manipulator 106 is set such that rotation of the polarization direction of the light outputted from the intermediate polarization manipulator 106 may result in the ring traversing a great circle on the Poincaré sphere. In one regard, by assuring that the resulting ring is a great circle, an absolute measure for assessing dSOP/dt may be obtained. An intermediate polarization manipulator 106 rotating at a uniform physical rate may generate a monotone dSOP/dt (i.e., a single rate), but other modes are possible by allowing the drive rate of the intermediate polarization manipulator 106 to vary as a function of time. In this manner, the scrambling distribution of the polarized light emitted from the polarization control system may be tailored in a time-averaged sense.

Figure 3:
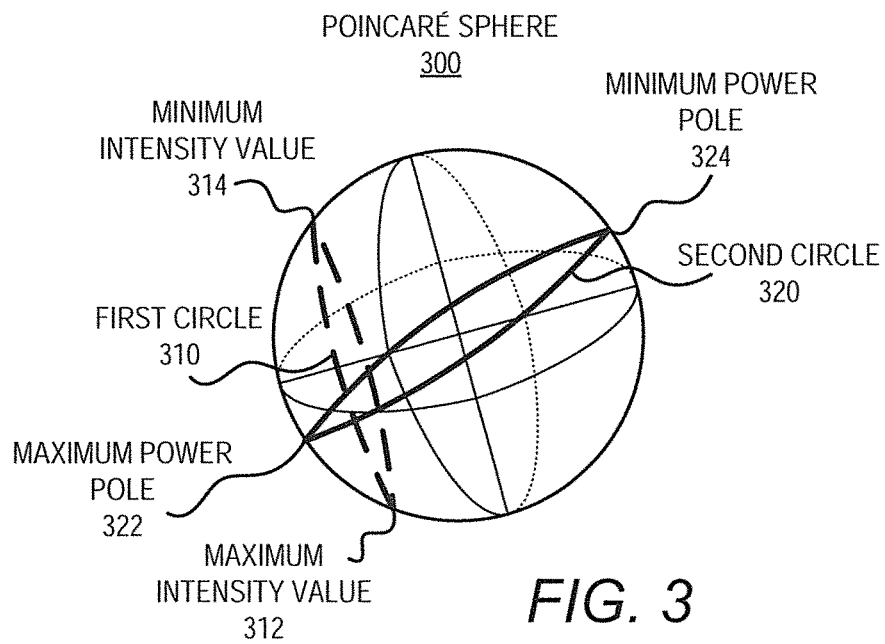
FIG. 3 shows a diagram of a Poincaré sphere on which is shown a first circle and a second circle, according to an example of the present disclosure.

As shown in FIG. 3, which depicts an example of a Poincaré sphere 300, the detected intensity values of the light that has passed through the polarizer 118 may be mapped as a first circle 310, which is shown as a dashed circle on the Poincaré sphere 300. Additionally, a second circle 320 that represents intensity values between a maximum possible intensity level and a minimum possible intensity level of light transmitted through the polarizer 118 is also depicted in FIG. 3. In other words, the second circle 320 represents the set of polarization states traced out during the course of physical rotation of the intermediate polarization manipulator 106, where the intensity values are measured at the detector 120 after passing through the polarizer 118, in which the extinction ratio of the polarizer 118 is known (or determined dynamically). With regard to the second circle 320, the intensity transmission through the polarizer 118 for incoming linearly polarized light will depend on the azimuthal angle of the plane of polarization relative to the polarizer axis. There are two chief angles, corresponding to two SOPS on the Poincaré sphere, of concern here. On the Poincaré sphere 300 these two states will be aligned 180° opposite to each other and are respectively shown as the maximum power pole 322 and the minimum power pole 324. The maximum power pole 322 corresponds to the maximum transmission SOP and the minimum power pole 324 corresponds to the minimum transmission SOP. In physical space, these angles correspond to the linear SOPs aligned to the polarizer 118 and crossed to the polarizer 118, respectively.

As seen in the Poincaré sphere 300, the intensity of light emitted through the polarizer 118 changes non-linearly. That is, as the second circle 320 is traversed (and the distance between the minimum/maximum angle of the polarizer 118 changes) the power goes up and down in a non-linear fashion. According to an example, the non-linear response of the polarizer 118 may be corrected by taking into account the extinction ratio (ER) of the polarizer 118. That is, through implementation of features disclosed herein, the non-linear response of the polarizer-detector system is linearized to talk of angular errors or misalignment.

By defining either of the maximum transmission SOP and the minimum transmission SOP as a reference state, an unambiguous position on the Poincaré sphere 300 may be determined along with a corresponding reference SOP, which is relative to the axis set forth by the polarizer. According to an example, the processor 122 may execute the instructions 128 and 130 such that an error between the first circle 310 and the second circle 320 is minimized, i.e., such that the first circle 310 substantially overlaps the second circle 320. The term "substantially" may be defined as some relationship that is within a predefined tolerance outside of a complete overlap. For instance, the first circle 310 may be considered to substantially overlap the second circle 320 when the first circle 310 is within about 5 degrees of the second circle 320.

More particularly, the processor 122 may execute the instructions 130 to manipulate the input polarization manipulator 104 to vary the intensity values detected by the detector 120 until the processor 122 determines that the first circle 310 resulting from the detected intensity values substantially overlaps the second circle 320. The processor 122 may do this in two steps: 1) linearize the power traces so as to discern and compute angular alignment information between the polarizer reference axis (axes in the second circle 320 (which may also be defined as a reference circle)) and the first circle 310 and 2) use the computed angular alignment information during iterative manipulation of the input polarization manipulator 104 to align the first circle 310 to the second circle 320 (e.g., the polarizer axis). The processor 122 may execute an algorithm to control the iterative manipulation of the input polarization manipulator 104, which is, for example, set up to simultaneously minimize two different objective functions. The first objective function is a measure of the 'openness' of the circle, where a maximally opened circle would result in a great circle, and the second objective function is to align the plane of the maximally opened circle to the plane of the polarizer Min/Max power poles (i.e., the second circle 320).

The processor 122 may thus iteratively manipulate the input polarization manipulator 104 until the processor 122 determines the setting of the input polarization manipulator 104 that results in the substantial overlap between the first circle 310 and the second circle 320. By manipulating the first input polarization manipulator 104 in this manner, the reference state may be achieved. For instance, the minimum power pole location 324 may be used as the reference SOP as this is a very sensitive alignment, and corresponds to maximum attenuation. This may be achieved by minimizing the observed power at the detector 120 as the processor 122 manipulates the input polarization manipulator 104 until that intensity value (e.g., power level) is reached. By way of particular example, the processor 122 may implement the simple Hill Climbing Algorithm to hunt for and achieve the reference SOP.

According to an example, the processor 122 may linearize the power readings to ultimately equate power with angular misalignments. That is, the processor 122 may execute the instructions 130 to determine an error between the first circle 310 and the second circle 320. More particularly, the processor 122 may determine an error between a maximum intensity value 312 of the detected intensity values and the maximum power pole location 322. The processor 122 may also determine an error between a minimum intensity value 314 of the detected intensity values and the minimum power pole location 324. The error between the first circle 310 and the second circle 320 may be an axis error, e.g., in which the axis along which the first circle 310 extends is offset from the axis along which the second circle 320 extends. The error may also be a diameter error, e.g., in which the diameter of the first circle 310 differs from the diameter of the second circle 320. As discussed in greater detail herein below, the processor 122 may manipulate the input polarization manipulator 104 to correct both of these errors, e.g., differences.

The machine-readable storage medium 124 may further include instructions 132 to manipulate the output polarization manipulator 108 to define a second SOP that enables the output light 114 to have a user-desired state. More particularly, the processor 122 may execute the instructions 132 to manipulate the output polarization manipulator 108 to apply a particular polarization level onto the light outputted from the intermediate polarization manipulator 106 to cause the output light 114 to have a particular SOP, e.g., a user-desired SOP. The processor 122 may execute the instructions 132 to determine how the output polarization manipulator 108 is to be manipulated based upon the determined reference SOP. That is, as discussed above, the light inputted into the output polarization manipulator 108 from the intermediate polarization manipulator 106 may be set to have a reference SOP, e.g., an SOP that corresponds to the maximum power pole 322 on the Poincaré sphere 300. The processor 122 may also manipulate the output polarization manipulator 108 to cause the output of the light as detected by multiple detectors as discussed with respect to FIG. 8 below, to be at target levels.

Generally speaking, the processor 122 may execute or implement the instructions 126-132 to manipulate the input polarization manipulator 104, and in certain examples, the output polarization manipulator 108, to enable the reference SOP of the light inputted into the output polarization manipulator 108 to be determined and set such that the SOP of the output light 114 may be set in a deterministic manner. In one regard, by setting the reference SOP of the output light 114 in a deterministic manner, the polarization direction of the output light 114 may be controlled in a relatively known manner through controlled manipulation of the intermediate polarization manipulator 106. Various manners in which the processor 122 may perform various operations through execution or implementation of the instructions 126-132 are described in greater detail herein below.

The machine-readable storage medium 124 may be any electronic, magnetic, optical, or other physical storage device that contains or stores executable instructions. Thus, the machine-readable storage medium 124 may be, for example, Random Access Memory (RAM), an Electrically Erasable Programmable Read-Only Memory (EEPROM), a storage device, an optical disc, and the like. In some implementations, the machine-readable storage medium 124 may be a non-transitory machine-readable storage medium, where the term "non-transitory" does not encompass transitory propagating signals.

According to another example, instead of being stored on the machine-readable storage medium 124, the instructions 126-132 may in addition or alternatively be stored in a circuit component. For instance, the instructions 126-132 may be hardwired into the processor 122. In this regard, the machine-readable storage medium 124 may instead be a circuit component without departing from a scope of the present disclosure.

Figure 4:
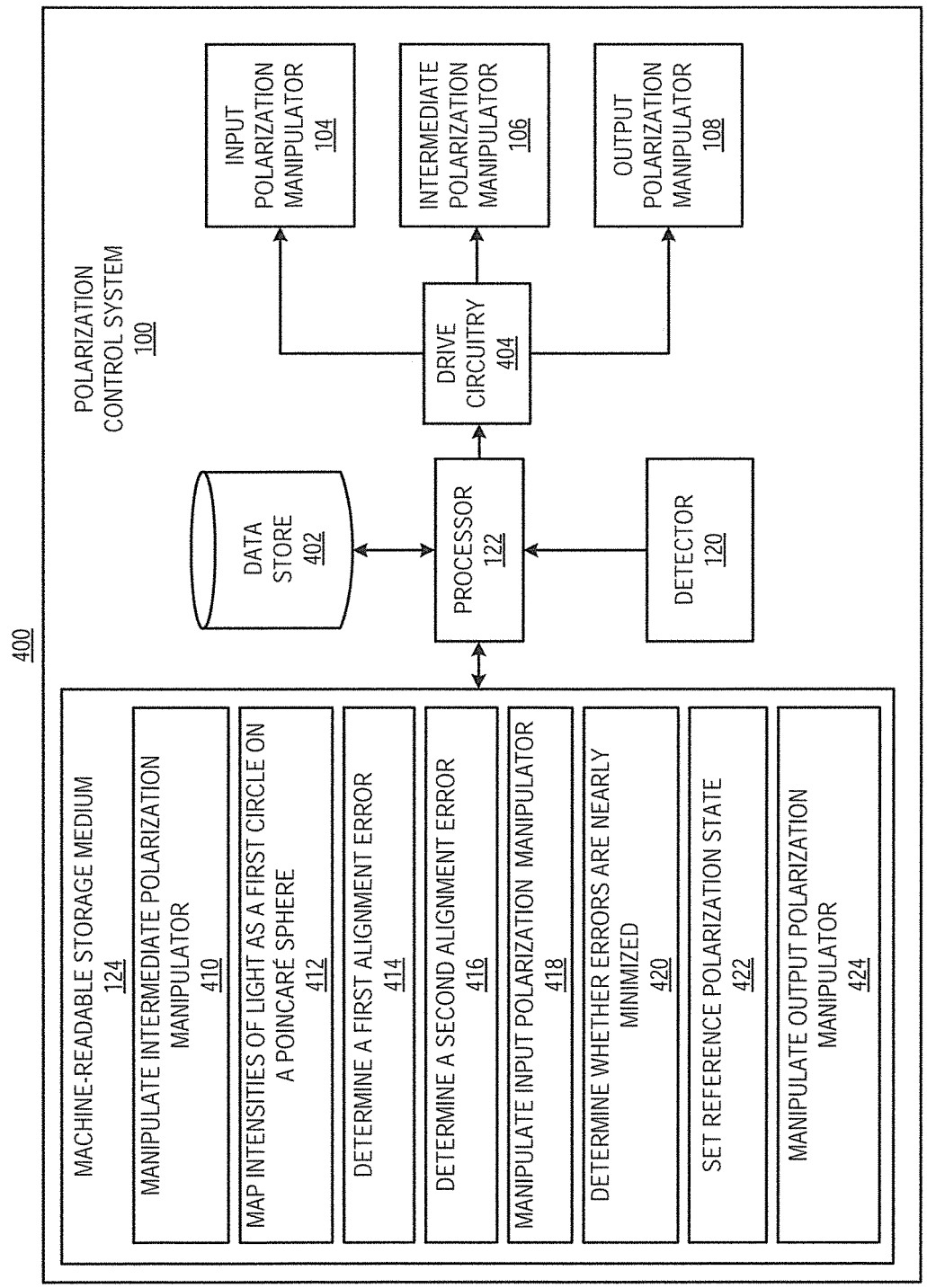
FIG. 4 shows a simplified block diagram of the polarization control system depicted in FIG. 1, according to an example of the present disclosure.

Turning now to FIG. 4, there is shown a simplified block diagram 400 of the polarization control system 100 depicted in FIG. 1, according to another example. The polarization control system 100 depicted in FIG. 4 includes many of the same features as those depicted in FIG. 1 and thus, features common to both figures will not be described in detail. The polarization control system 100 depicted in FIG. 4 differs from the polarization control system 100 depicted in FIG. 1 in that in FIG. 4, the polarization control system 100 is depicted as also including a data store 402 and drive circuitry 404. In addition, the machine-readable storage medium 124 is depicted as storing additional instructions 410-424.

Similarly to FIG. 1, the processor 122 depicted in FIG. 4 may receive signals from the detector 120 corresponding to intensities of light hitting the detector 120 after going through the polarizer 118. In addition, the processor 122 may store the received signals in the data store 402, which may be Random Access Memory (RAM), an Electrically Erasable Programmable Read-Only Memory (EEPROM), a storage device, an optical disc, and the like. According to an example, the processor 122 may control operations of the input polarization manipulator 104, the intermediate polarization manipulator 106, and the output polarization manipulator 108 through communication of instructions via the drive circuitry 404. For instance, in an example in which each of the manipulators 104-108 is a Lithium Niobate manipulator, the drive circuitry 404 may vary in the amount of voltage applied to each of the manipulators 104-108 to thus control the polarization applied onto the light emitted through the manipulators 104-108. In another example in which each of the manipulators 104-108 is a bulk crystalline type waveplate type of manipulator, the drive circuitry 404 may physically rotate the manipulators 104-108 to control the polarization applied onto the light emitted through the manipulators 104-108.

As discussed above, the machine-readable storage medium 124 may be Random Access Memory (RAM), an Electrically Erasable Programmable Read-Only Memory (EEPROM), a storage device, an optical disc, and the like. In other examples, the machine-readable storage medium 124 may be a circuit component. In this regard, the instructions 410-424 may be instructions stored in a memory and/or instructions programmed into a circuit component, such as a logic device. In any regard, the processor 122 is to implement or execute the instructions 410-424 as discussed in greater detail herein below to control the reference polarization state of the light inputted into the polarization control system 100.

Figure 5A:
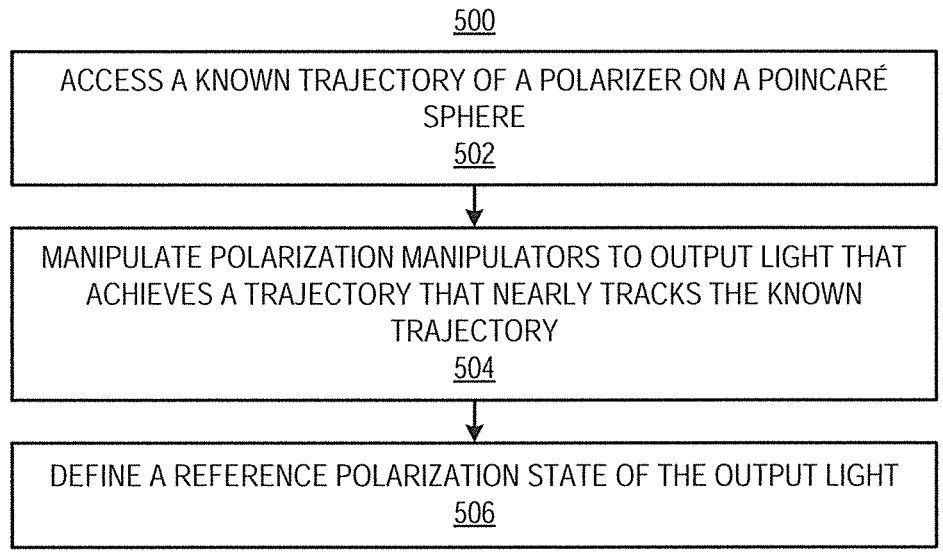
FIGS. 5A, 5B, and 6, respectively depict flow diagrams of method for controlling the reference polarization state of light in a polarization control system, according to examples of the present disclosure.
Figure 5B:
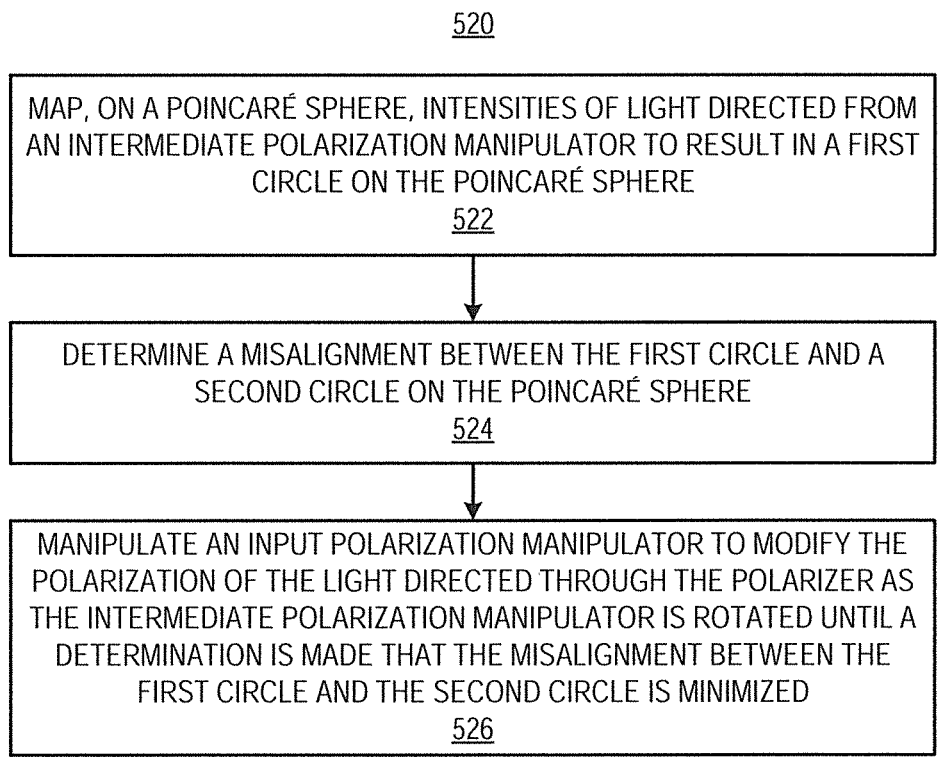
Figure 6:
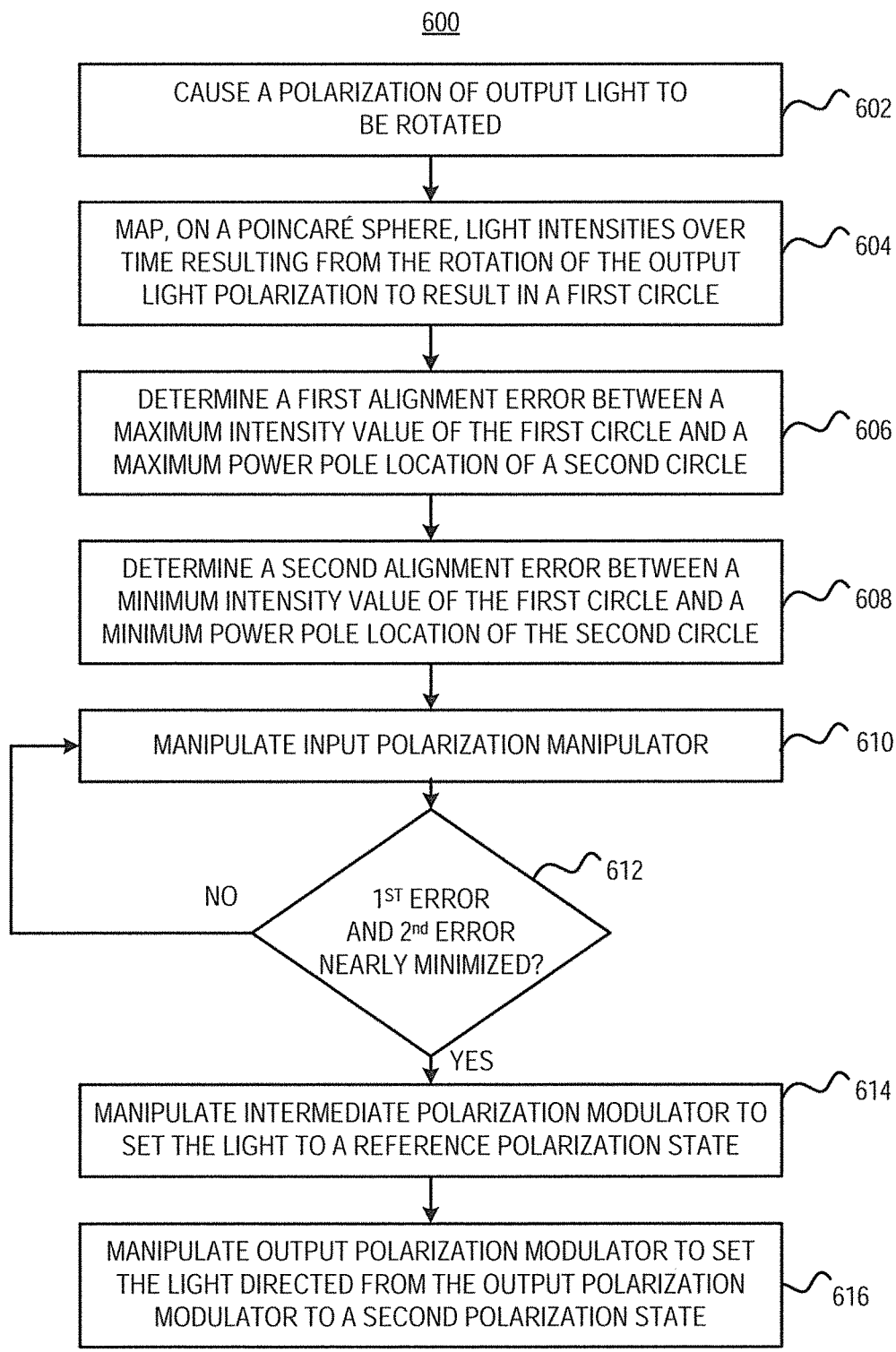

With reference now to FIGS. 5A, 5B, and 6, there are respectively shown flow diagrams of methods 500, 520, and 600 for controlling the polarization state of light in a polarization control system 100, according to multiple examples. The methods 520 and 600 are related to the method 500 in that the methods 520 and 600 provide additional detail with respect to the features recited in the method 500. It should be understood that the methods 500, 520, and 600 depicted in FIGS. 5A, 5B, and 6 may include additional operations and that some of the operations described therein may be removed and/or modified without departing from the scopes of the methods 500, 520, and 600. Additionally, it should be understood that the order in which some of the operations in the methods 500, 520, and 600 are implemented may be switched.

With reference first to FIG. 5A, at block 502, the processor 122 may access a known trajectory of a polarizer 118 on a Poincaré sphere. For instance, the trajectory of the polarizer 118 may have been previously determined, e.g., through testing, by the polarizer 118 manufacturer, etc., and information pertaining to the trajectory may have been stored in the data store 402. The processor 122 may thus access the known trajectory of the polarizer 118 on the Poincaré sphere from the data store 402.

At block 504, the processor 122 may manipulate polarization manipulators to output light that achieves a trajectory on the Poincaré sphere that at least nearly tracks the known trajectory of the polarizer 118. That is, the processor 122 may manipulate an input polarization manipulator 104 and an intermediate polarization manipulator 106 such that an output of the light from the intermediate polarization manipulator 106 at least nearly tracks the known trajectory of the polarizer 118. As used herein, the terms "at least nearly tracks" may be defined to include instances in which the trajectory of the output light on the Poincaré sphere resulting from manipulation of the polarization manipulators is within a predetermined misalignment from the known trajectory of the polarizer 118. In another example, the processor 122 may determine that the trajectory of the output light at least nearly tracks the known trajectory when a predetermined number of iterations of polarization manipulator manipulations have been performed. In a further example, the processor 122 may determine that the trajectory of the output light at least nearly tracks the known trajectory when the processor 122 determines that further manipulations of the polarization manipulators do not result in a misalignment between the trajectories being further reduced.

With reference now to FIG. 5B, at block 522, the processor 122 may determine, on a Poincaré sphere that graphically represents polarization states of light, a first circle that corresponds to the values of a plurality of intensities of light as polarization of the light is rotated by an intermediate polarization manipulator 106 and detected by a detector 120 following emission of the light through a polarizer 118, in which the light is inputted to the intermediate polarization manipulator 106 from an input polarization manipulator 104. As shown in FIG. 1, an input light 112 may be emitted through the input polarization manipulator 104 and the input polarization manipulator 104 may change a polarization direction of the input light 112 prior to directing the polarized light into the intermediate polarization manipulator 104. That is, the input polarization manipulator 104 may change the polarization direction of the input light 112 depending upon a setting of the input polarization manipulator 104.

As also discussed above, the intermediate polarization manipulator 106 may cause the polarization of the light output from the intermediate polarization manipulator 106 to be rotated. In addition, the polarization directions of the light outputted from the intermediate polarization manipulator 106 as the intermediate polarization manipulator 106 is manipulated to rotate the polarization directions, e.g., through 360 degrees of rotation, may depend upon the polarization direction of the input light 112 supplied into the intermediate polarization manipulator 106. Moreover, the changes in polarization direction may result in changes in the intensities of the light detected at the detector 120 over time. An example of the changes in the intensities of the light over time is depicted in FIG. 2. Additionally, an example of a Poincaré sphere on which the intensities of light has been mapped is depicted in FIG. 3. As shown in FIG. 3, because the intensities of light modulate between a minimum intensity value 210 and a maximum intensity value 220, the mapping of the intensities of light results in a first circle 310.

At block 524, the processor 122 may determine a misalignment between the first circle 310 and a second circle 320 on the Poincaré sphere 300, in which the second circle 320 is a great circle that maps to a rate of polarization change of the polarizer 118 and coincides with minimum and maximum power poles 322, 324 of the polarizer 118 along a plane of the Poincaré sphere 300. As discussed above with respect to FIGS. 1-3, the second circle 320 may represent the values corresponding to the polarizer 118, in which the extinction ratio of the polarizer 118 is known to have a maximum power pole 324 and a minimum power pole 322 that are positioned on opposite poles of the Poincaré sphere 300.

At block 526, the processor 122 may iteratively manipulate the input polarization manipulator 104 to vary a polarization of the light supplied into the intermediate polarization manipulator 106 to modify the polarization of the light directed through the polarizer 118 as the intermediate polarization manipulator 106 is rotated until a determination is made that the first circle 310 at least nearly overlaps the second circle 320. As used herein, the terms "at least nearly overlaps" may be defined to include both instances in which the first circle 310 overlaps the second circle 320 and instances in which the first circle 310 is which a predetermined angular misalignment from the second circle 320, e.g., within about 5°. In another example, the processor 122 may determine that the first circle 310 at least nearly overlaps the second circle 320 when a predetermined number of iterations of input polarization manipulator 104 manipulations have been performed. In a further example, the processor 122 may determine that the first circle 310 at least nearly overlaps the second circle 320 when the processor 122 determines that further manipulations of the input polarization manipulator 104 do not result in a misalignment between the first circle 310 and the second circle being further reduced.

That is, for instance, the processor 122 may communicate an instruction to the drive circuitry 404 to manipulate the input polarization manipulator 104 to vary the polarization direction of the light by a predetermined amount. The change in the polarization direction of the light supplied into the intermediate polarization manipulator 106 may result in a change in the intensity values detected by the detector 120 as the polarization direction of the light outputted from the intermediate polarization manipulator is rotated over time. The processor 122 may map the changed intensity values onto the Poincaré sphere 300 to obtain a changed first circle 310. The processor 122 may also determine whether the changed first circle is misaligned from the second circle 320 and/or if the misalignment exceeds a predetermined value. In either case, the processor 122 may communicate another instruction to the drive circuitry 404 to manipulate the input polarization manipulator 104 to vary the polarization direction of the light supplied into the intermediate polarization manipulator 106. The processor 122 may repeat the above-described process until the processor 122 determines that the first circle 310 at least nearly overlaps the second circle 320.

Turning now to FIG. 6, at block 602, the processor 122 may implement the instructions 410 to manipulate the intermediate polarization manipulator 106 to cause a polarization of light outputted from the intermediate polarization manipulator 106 to be rotated. In other words, the processor 122 may cause the polarization of the light outputted from the intermediate polarization manipulator 106 to undergo at least a partial cycle of rotation, e.g., less than, equal to, or more than a 360° rotation. By way of example, the processor 122 may cause the polarization of the light outputted from the intermediate polarization manipulator 106 to undergo more than one full rotation to provide more accurate power measurements. In any regard, the processor 122 may receive signals from the detector 120 corresponding to the intensity levels of the light as the polarization of the light is rotated and passes through the polarizer 118.

At block 604, the processor 122 may implement the instructions 412 to map, on a Poincaré sphere that graphically represents polarization states of light, a first circle that corresponds to the values of detected intensities of light. The processor 122 may map the detected intensities of light onto the Poincaré sphere as discussed above with respect to block 522 in FIG. 5.

Figure 7A:
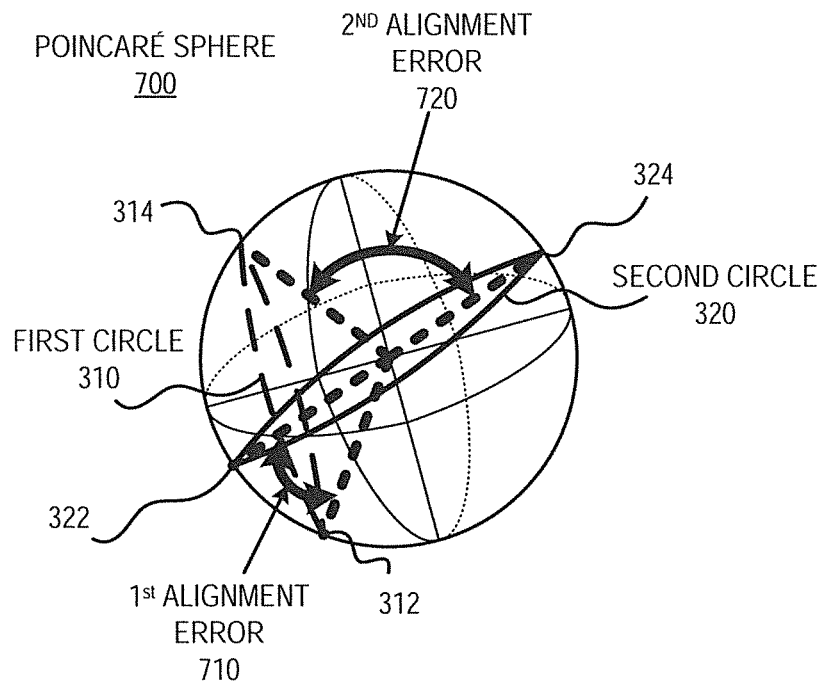
FIGS. 7A-7C, respectively, depict diagrams of a Poincaré sphere at various stages of method depicted in FIG. 6, according to an example of the present disclosure.

At block 606, the processor 122 may implement the instructions 414 to determine a first alignment error between a maximum intensity value 312 of the first circle 310 and a maximum power pole location 322 of a second circle 320, in which the second circle 320 maps to a rate of polarization change of the polarizer 118. As shown in FIG. 3, the power poles 322 and 324 corresponding to the polarizer 118 may map to a great circle along an axis of the Poincaré sphere 300, such that the maximum power pole 322 of the second circle 320 and the minimum power pole 324 of the second circle 320 are positioned at 180° apart from each other on the Poincaré sphere 300. As shown in FIG. 7A, which depicts a Poincaré sphere 700 according to another example, a first alignment error 710 may be an angle error (or angular misalignment) defined by a first angle that extends between a first virtual line extending from the center of the Poincaré sphere 700 to the maximum power pole location 322 and a second virtual line extending from the center of the Poincaré sphere 700 to the maximum intensity value 312. These virtual lines enable a measure of the misalignment angle between the planes of rotation and a reference plane.

At block 608, the processor 122 may implement the instructions 416 to determine a second alignment error between a minimum intensity value 314 of the first circle 310 and a minimum power pole 324 of the second circle 320. As shown in FIG. 7A, the second alignment error 720 may be an angle error (or angular misalignment) defined by a second angle that extends between a third virtual line extending from the center of the Poincaré sphere 700 to the minimum power pole location 324 and a fourth virtual line extending from the center of the Poincaré sphere 700 to the minimum intensity value 314. These virtual lines enable a measure of the offset of the plane of the rotation trajectory and the reference plane.

Figure 7B:
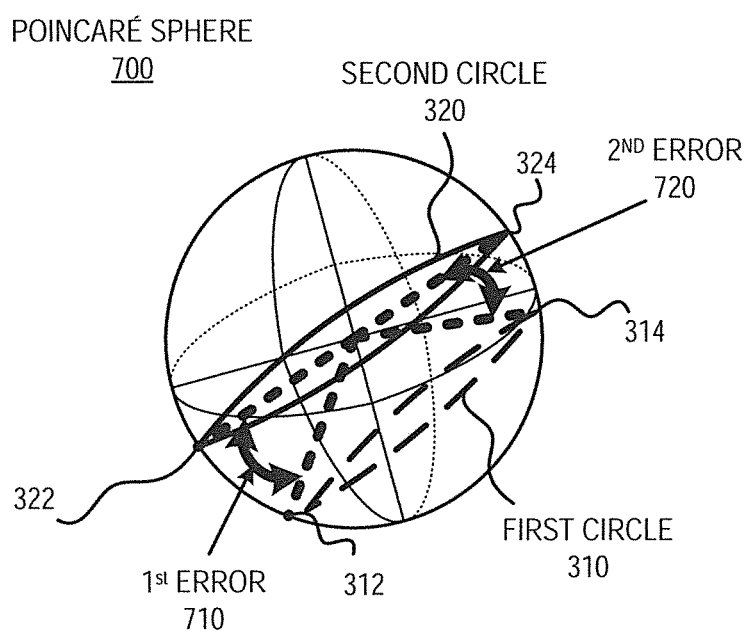

At block 610, the processor 122 may implement the instructions 418 to manipulate the input polarization manipulator 104 to vary the polarization of the light supplied into the intermediate polarization manipulator 106. By way of example, manipulation of the input polarization manipulator 104 may result in the first alignment error 710 and the second alignment error 720 being reduced as shown in FIG. 7B. At block 612, the processor 122 may implement the instructions 420 to determine whether the first alignment error 710 and the second alignment error 720 are at least nearly minimized, e.g., whether the diameter of the first circle 310 is at least nearly maximized, following the manipulation of the input polarization manipulator 104. In response to a determination that the first alignment error 710 and the second alignment error 720 are not nearly minimized, the processor 122 may repeat block 610. The processor 122 may repeat blocks 610 and 612 until a determination is made that the first alignment error 710 and the second alignment error 720 are at least nearly minimized.

As used herein, the terms "at least nearly minimized" may be defined to include instances in which the first alignment error 710 and the second alignment error 720 are equal to zero and instances in which the first alignment error 710 and the second alignment error 720 are within a predetermined value, e.g., a user-defined predetermined value. In another example, the processor 122 may determine that the first alignment error 710 and the second 720 alignment error are nearly minimized when a predetermined number of iterations of blocks 610 and 612 have been performed, for instance, about 10 or more iterations. In a further example, the processor 122 may determine that the first alignment error 710 and the second alignment error 720 are nearly minimized when the processor 122 determines that further manipulations of the input polarization manipulator 104 do not result in the first alignment error 710 and the second alignment error 720 being further reduced.

According to an example, the processor 122 implements an axis optimization process at blocks 610 and 612, in which the axis optimization process minimizes the weighted sum of the AVERAGE_ANGLE_ERROR+ERROR_DELTA, in which:

AVERAGE_ANGLE_ERROR=(first angular error+
second angular error)/2; and

ERROR_DELTA=abs(first angular error−second
angular error).

In other words, the processor 122 may manipulate the input polarization manipulator 104 to minimize:

FB1=w1*AVERAGE_ANGLE_ERROR+
w2*ERROR_DELTA.

In FB1, the weights w1 and w2 may be equal to each other or may differ from each other and may be user defined.

Figure 7C:
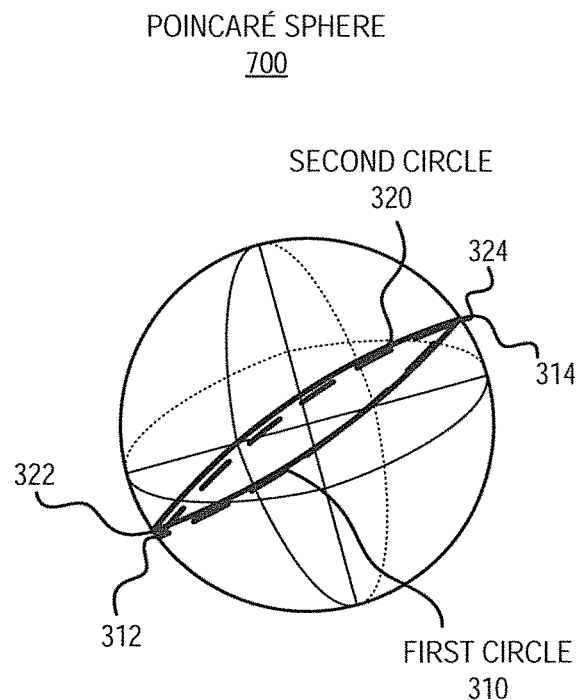

Returning back to block 612, when the first alignment error 710 and the second alignment error 720 are nearly minimized, FB1 will also be nearly minimized. In other words, the maximum intensity value 312 will be nearly identical to the maximum power pole 322 and the minimum intensity value 314 will be nearly identical to the minimum power pole 324. In addition, the diameter of the first circle 310 will be nearly maximized, e.g., has nearly the largest possible diameter across the Poincaré sphere 700. An example in which the first alignment error 710 and the second alignment error 720 are nearly minimized is depicted in FIG. 7C, which shows the first circle 310 nearly overlapping the second circle 320.

Following the "yes" condition at block 612, the polarization state of the light outputted from the input polarization manipulator 104 and supplied into the intermediate polarization manipulator 106 may be set such that manipulation of the intermediate polarization manipulator 106, e.g., rotation of the polarization of light outputted from the intermediate polarization manipulator 106, causes the polarization to change at a rate that is similar to the rate of change of the polarizer 118. That is, rotation of the intermediate polarization manipulator 106 may cause the change in polarization of the light outputted from the intermediate polarization manipulator 106 as the intermediate polarization manipulator 106 is rotated to follow a trajectory across the Poincaré sphere 300 that is nearly aligned with a great circle on the Poincaré sphere 300 because the trajectory subtends the axis set out by the reference polarizer 118.

At block 614, the processor 122 may implement the instructions 422 to set the light outputted from the intermediate polarization manipulator 106 to a polarization reference state. For instance, the intermediate polarization manipulator 106 may be set to cause the polarization state of the light to be nearly equal to one of the maximum power pole 322 and the minimum power pole 324. That is, the intermediate polarization manipulator 106 may be set such that the polarization state of the light is at one of the minimum intensity level and the maximum intensity level of the polarizer 118. By way of particular example, the polarization reference state (or reference SOP) may be set to be equivalent to, for instance, the polarization state that is nearly equal to the maximum power pole 322 (e.g., maximum intensity) of the polarizer 118.

At block 616, the processor 122 may implement the instructions 424 to manipulate the output polarization manipulator 108 to set the light directed from the output polarization manipulator 106 to a second polarization state. According to an example, the polarization state of the light directed from the output polarization manipulator 108 may be tracked by manipulating the output polarization manipulator 108 such that the intensity levels of the light detected after being emitted through two polarizers that polarize light at 45° with respect to each other at a fixed target level.

An example of a polarization control system 800, which may include similar components to the polarization control system 100 depicted in FIG. 1, is depicted in FIG. 8. However, the polarization control system 1000 differs from the polarization control system 100 in that the polarization control system 800 may include a splitter 802 to split the tapped light 116 outputted from the output polarization manipulator 108 to both the polarizer 118 and to a second polarizer 804. In addition, the polarization control system 800 may include a second detector 806 to detect light emitted through the second polarizer 804. According to an example, the second polarizer 1004 may polarize light at an angle of 45° with respect to the polarization performed by the polarizer 118. The addition of the second polarizer 804 generally enables two sets of axes to be obtained to form a planar frame of reference in the Poincaré sphere state space.

According to an example, the processor 122 may manipulate the output polarization manipulator 108 to set the light directed from the output polarization manipulator 108 at a known, e.g., predefined or user-defined polarization state, through use of the intensities of light detected by the detectors 120, 806. Particularly, the processor 122 may track the polarization of the light directed from the output polarization manipulator 108 by maintaining the light directed from the output polarization manipulator 108 at a state that results in the intensities of the light detected by the detectors 120 and 806 at a fixed target level, in which the fixed target level corresponds to a desired polarization state from the reference polarization state. For instance, the detected intensities may be used to determine the drift from the reference polarization state and the drift may be used to determine the polarization of the output light.

Some or all of the operations set forth in the methods 500 and 600 may be contained as utilities, programs, or subprograms, in any desired computer accessible medium. In addition, the methods 500 and 600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 9:
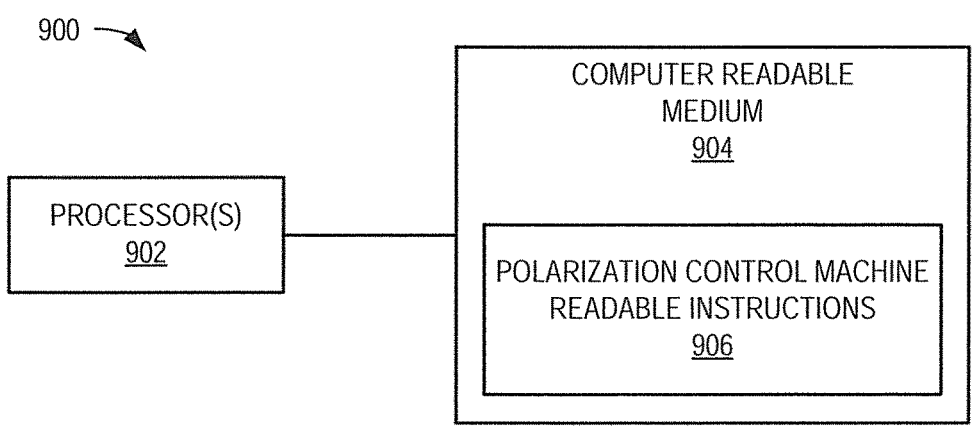
FIG. 9 is schematic representation of a computing apparatus that includes polarization control machine readable instructions, according to an example of the present disclosure.

Turning now to FIG. 9, there is shown a schematic representation of a computing apparatus 900, according to an example. The computing apparatus 900 may include a processor(s) 902, which may be equivalent to the processor 122 and a computer-readable medium 904, which may be equivalent to the machine-readable medium 124.

The computer readable medium 904 may be any suitable medium that participates in providing instructions to the processor 902 for execution. For example, the computer readable medium 904 may be non-volatile media, such as an optical or a magnetic disk; volatile media, such as memory. The computer-readable medium 904 may also store polarization control machine readable instructions 906, which, when executed may cause the processor 902 to perform some or all of the methods 500 and 600, respectively depicted in FIGS. 5 and 6.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A polarization control system comprising:
   polarization manipulators including an input polarization manipulator and an intermediate polarization manipulator, the input polarization manipulator to supply light into the intermediate polarization manipulator;
   a processor; and
   a memory on which is stored instructions that are to cause the processor to:
      access, as detected by a detector, intensities of light as the input polarization manipulator is iteratively manipulated, the detector to detect the intensity of the light after the light has been emitted through the intermediate polarization manipulator and a polarizer, wherein the polarizer is to receive light from the polarization manipulators via a tap that is split from an egress fiber of the polarization manipulators;
      iteratively map, onto a Poincaré sphere, the detected intensities of light as the input polarization manipulator is iteratively manipulated and the polarization of the light is rotated over time by the intermediate polarization manipulator, wherein the iteratively mapped intensities over time result in a first circle on the Poincaré sphere;
      determine a misalignment between the first circle and a second circle on the Poincaré sphere, wherein the second circle is a great circle that coincides with a trajectory of the polarizer on the Poincaré sphere;
      determine, from the mappings, a manipulation of the input polarization manipulator that results in the misalignment between the first circle and the second circle being at least nearly minimized;
      manipulate the input polarization manipulator to modify a polarization of the light supplied into the intermediate polarization manipulator as the intermediate polarization manipulator is rotated until a determination is made that the misalignment between the first circle and the second circle is at least nearly minimized; and
      define a reference polarization state of the light supplied from the polarization manipulators.

2. The polarization control system according to claim 1, wherein the first circle identifies a maximum intensity value and a minimum intensity value of the light as the intermediate polarization manipulator rotates the polarization of the light, and wherein the instructions are further to cause the processor to:
   determine a first alignment error between the maximum intensity value and a maximum power pole along the trajectory of the polarizer on the Poincaré sphere;
   determine a second alignment error between the minimum intensity value and a minimum power pole along the trajectory of the polarizer on the Poincaré sphere; and
   manipulate the input polarization manipulator to vary the polarization of the light supplied to the intermediate polarization manipulator until a determination is made that the first alignment error and the second alignment error are at least nearly minimized.

3. The polarization control system according to claim 2, wherein to determine the first alignment error and the second alignment error, the processor is further to:
   determine a first angle between a first virtual line extending from a center of the Poincaré sphere to the maximum power pole and a second virtual line extending from the center of the Poincaré sphere to the maximum intensity value;
   determine a second angle between a third virtual line extending from the center of the Poincaré sphere to the minimum power pole and a fourth virtual line extending from the center of the Poincaré sphere to the minimum intensity value; and
   wherein the processor is further to manipulate the input polarization manipulator until the first angle and the second angle are substantially minimized such that the first ring extends along a plane that is parallel to a second plane and has a substantially maximized diameter.

4. The polarization control system according to claim 1, wherein to define the reference polarization state, the instructions are further to cause the processor to set the light directed from the intermediate polarization manipulator to be at least nearly equivalent to a maximum power pole of the polarizer along the trajectory of the polarizer on the Poincaré sphere.

5. The polarization control system according to claim 4, further comprising:

an output polarization manipulator to receive light directed from the intermediate polarization manipulator; and wherein the instructions are further to cause the processor to set the light directed from the output polarization manipulator to a second polarization state through manipulation of the output polarization manipulator, wherein the second polarization state is a predefined polarization state, and wherein the instructions are further to cause the processor to:

set the light directed from the output polarization manipulator to the second polarization state by manipulating the output polarization manipulator to cause intensities of light emitted through multiple polarizers that are to polarize light at different angles with respect to each other to be at fixed target levels.

6. A method for polarization control comprising:

accessing, by a processor and as detected by a detector, intensities of light as an input polarization manipulator is iteratively manipulated, the detector to detect the intensity of light after the light has been emitted through an intermediate polarization manipulator and a polarizer, the polarizer being positioned to polarize light directed to the detector from the input polarization manipulator and the intermediate polarization manipulator, the input polarization manipulator to supply light into the intermediate polarization manipulator, wherein the polarizer is to receive light from the intermediate polarization manipulator via a tap that is split from an egress fiber of the intermediate polarization manipulator;

iteratively mapping, by the processor and onto a Poincaré sphere, the detected intensities of light as the input polarization manipulator is iteratively manipulated and the polarization of the light is rotated over time by the intermediate polarization manipulator, wherein the iteratively mapped intensities over time result in a first circle on the Poincaré sphere;

determining, by the processor, a misalignment between the first circle and a second circle on the Poincaré sphere, wherein the second circle is a great circle that coincides with a trajectory of the polarizer on the Poincaré sphere;

determining, by the processor and from the mappings, a manipulation of the input polarization manipulator that results in the misalignment between the first circle and the second circle being at least nearly minimized;

manipulating, by the processor, the input polarization manipulator to modify a polarization of the light supplied into the intermediate polarization manipulator as the intermediate polarization manipulator is rotated until a determination is made that the misalignment between the first circle and the second circle is at least nearly minimized; and defining, by the processor, a reference polarization state of the light output from the input and the intermediate polarization manipulators.

7. The method according to claim 6, wherein the first circle identifies a maximum intensity value and a minimum intensity value of the light as the intermediate polarization manipulator rotates the polarization of the light, said method further comprising:

determining a first alignment error between the maximum intensity value and a maximum power pole along the trajectory of the polarizer on the Poincaré sphere;

determining a second alignment error between the minimum intensity value and a minimum power pole along the trajectory of the polarizer on the Poincaré sphere; and wherein iteratively manipulating the input polarization manipulator further comprises iteratively manipulating the input polarization manipulator to vary the polarization of the light supplied to the intermediate polarization manipulator until both the first alignment error and the second alignment error are at least nearly minimized.

8. The method according to claim 7, wherein determining the first alignment error comprises determining a first angle between a first virtual line extending from a center of the Poincaré sphere to the maximum power pole and a second virtual line extending from the center of the Poincaré sphere to the maximum intensity value;

wherein determining the second alignment error comprises determining a second angle between a third virtual line extending from the center of the Poincaré sphere to the minimum power pole and a fourth virtual line extending from the center of the Poincaré sphere to the minimum intensity value; and wherein iteratively manipulating the input polarization manipulator further comprises iteratively manipulating the input polarization manipulator until the first angle and the second angle are at least substantially minimized.

9. The method according to claim 6, wherein defining the reference polarization state further comprises setting the light directed from the intermediate polarization manipulator to be at least nearly equivalent to a maximum power pole of the polarizer along the trajectory of the polarizer on the Poincaré sphere.

10. The method according to claim 9, further comprising:

manipulating an output polarization manipulator that is to receive light directed from the intermediate polarization manipulator to set the light directed from the output polarization manipulator to a second polarization state.

11. The method according to claim 10, wherein the second polarization state is a predefined polarization state, said method further comprising:

manipulating the output polarization manipulator to cause intensities of light emitted through multiple polarizers that are to polarize light at different angles with respect to each other to be at fixed target levels to set the light directed from the output polarization manipulator to the second polarization state.

12. A non-transitory computer readable storage medium on which is stored machine readable instructions that when executed by a processor, cause the processor to:

access, as detected by a detector, intensities of light as an input polarization manipulator is iteratively manipulated, the detector to detect the intensity of light after the light has been emitted through an intermediate polarization manipulator and a polarizer, the polarizer being positioned to polarize light directed to a detector from polarization manipulators, wherein the polarizer is to receive light from the input and intermediate polarization manipulators via a tap that is split from an egress fiber of the input and intermediate polarization manipulators and the input polarization manipulator to supply light into the intermediate polarization manipulator;

iteratively map, onto a Poincaré sphere, the detected intensities of light as the input polarization manipulator is iteratively manipulated and the polarization of the light is rotated over time by the intermediate polarization manipulator, wherein the iteratively mapped intensities over time result in a first circle on the Poincaré sphere;
determine a misalignment between the first circle and a second circle on the Poincaré sphere, wherein the second circle is a great circle that coincides with a trajectory of the polarizer on the Poincaré sphere;
determine, from the mappings, a manipulation of the input polarization manipulator that results in the misalignment between the first circle and the second circle being at least nearly minimized;
manipulate the input polarization manipulator to modify a polarization of the light supplied into the intermediate polarization manipulator as the intermediate polarization manipulator is rotated until a determination is made that the misalignment between the first circle and the second circle is at least nearly minimized; and
define a reference polarization state of the light output from the input and the intermediate polarization manipulators.

13. The non-transitory computer readable storage medium according to claim 12, wherein the first circle identifies a maximum intensity value and a minimum intensity value of the light as the intermediate polarization manipulator rotates the polarization of the light, wherein the machine readable instructions are further to cause the processor to:
determine a first alignment error between the maximum intensity value and a maximum power pole along the trajectory of the polarizer on the Poincaré sphere;
determine a second alignment error between the minimum intensity value and a minimum power pole along the trajectory of the polarizer on the Poincaré sphere; and
iteratively manipulate the input polarization manipulator to vary the polarization of the light supplied to the intermediate polarization manipulator until both the first alignment error and the second alignment error are at least nearly minimized.

14. The non-transitory computer readable storage medium according to claim 13, wherein the maximum power pole and the minimum power pole are located on opposite poles of the Poincaré sphere such that a cross-section of the second circle connecting the maximum power pole and the minimum power pole includes a center of the Poincaré sphere, wherein the machine readable instructions are further to cause the processor to:
iteratively manipulate the input polarization manipulator until a rate of change in the light intensity value results in the first circle at least substantially overlapping the second circle.

15. The non-transitory computer readable storage medium according to claim 12, wherein the machine readable instructions are further to cause the processor to:
set the light directed from the intermediate polarization manipulator to be at least nearly equivalent to a maximum power pole of the polarizer along the trajectory of the polarizer on the Poincaré sphere.

16. The non-transitory computer readable storage medium according to claim 15, wherein the machine readable instructions are further to cause the processor to:
manipulate an output polarization manipulator that is to receive light directed from the intermediate polarization manipulator to set the light directed from the output polarization manipulator to a second polarization state, wherein the second polarization state is a predefined polarization state, and
wherein the instructions are further to cause the processor to:
set the light directed from the output polarization manipulator to the second polarization state by manipulating the output polarization manipulator to cause intensities of light emitted through multiple polarizers that are to polarize light at different angles with respect to each other to be at fixed target levels.

* * * * *